(12) United States Patent
Chisholm

(10) Patent No.: US 7,875,227 B2
(45) Date of Patent: *Jan. 25, 2011

(54) MOLDED PLASTIC CONTAINER AND PREFORM HAVING INSERT-MOLDED RFID TAG

(75) Inventor: Brian J. Chisholm, Sylvania, OH (US)

(73) Assignee: Rexam Healthcare Packaging Inc., Perrysburg, OH (US)

( * ) Notice: Subject to any disclaimer, the term of this patent is extended or adjusted under 35 U.S.C. 154(b) by 611 days.

This patent is subject to a terminal disclaimer.

(21) Appl. No.: 11/607,524

(22) Filed: Dec. 1, 2006

(65) Prior Publication Data

US 2008/0129514 A1 Jun. 5, 2008

(51) Int. Cl.
B29C 45/14 (2006.01)

(52) U.S. Cl. .............. 264/272.15; 264/272.11; 264/275

(58) Field of Classification Search ............ 264/272.15, 264/275, 259, 500, 523
See application file for complete search history.

(56) References Cited

U.S. PATENT DOCUMENTS

| | | | | |
|---|---|---|---|---|
| 2,788,048 | A | * 4/1957 | Kimes | ............ 152/211 |
| 3,919,374 | A | 11/1975 | Komendowski | |
| 4,218,204 | A | 8/1980 | Edwards | |
| 4,708,630 | A | 11/1987 | Hammond | |
| 5,973,599 | A | 10/1999 | Nicholson et al. | |
| 6,226,619 | B1 | 5/2001 | Halperin et al. | |
| 6,255,949 | B1 | 7/2001 | Nicholson et al. | |
| 6,268,037 | B1 | * 7/2001 | Butler et al. | ............ 428/100 |
| 6,302,461 | B1 | 10/2001 | Debras et al. | |
| 6,475,443 | B1 | 11/2002 | Van Deursen et al. | |

2003/0235027 A1 12/2003 Smeyak et al.

(Continued)

FOREIGN PATENT DOCUMENTS

WO WO 93/24381 12/1993

(Continued)

OTHER PUBLICATIONS

Elsila, Martti, Mika Sulasari, "Method for providing a transport or storage structure with a remote-readable escort memory and a transport or storage structure" WO 93/24381, PCTFI93/00225, Published Dec. 9, 1993.*

(Continued)

Primary Examiner—Christina Johnson
Assistant Examiner—Galen Hauth
(74) Attorney, Agent, or Firm—Reising Ethington PC

(57) ABSTRACT

An RFID assembly includes a base having a peripheral wall, an RFID inlay including an RFID tag disposed within the peripheral wall, and a disk having a periphery engaged by the peripheral wall to capture the inlay between the base and the disk within the peripheral wall. One of the base and the disk has external fingers for releasably securing the assembly to a support structure, such as a projection on a mold core for disposition within a mold cavity to mold a container preform around the mold core within which the RFID assembly is embedded. The container preform can be blow molded into a hollow plastic container within which the RFID assembly is embedded. The projection preferably is on an end of the mold core, so that the RFID assembly is embedded in an end wall of the preform and a bottom wall of the container.

4 Claims, 2 Drawing Sheets

U.S. PATENT DOCUMENTS

| | | |
|---|---|---|
| 2004/0238623 A1 | 12/2004 | Asp |
| 2005/0068182 A1 | 3/2005 | Dunlap et al. |
| 2006/0076419 A1 | 4/2006 | Johnson |
| 2006/0086808 A1 | 4/2006 | Appalucci et al. |
| 2008/0131629 A1* | 6/2008 | Chisholm et al. .......... 428/34.1 |

FOREIGN PATENT DOCUMENTS

| | | |
|---|---|---|
| WO | WO 2006/039461 A2 | 4/2006 |

OTHER PUBLICATIONS

Collins, Jonathan, "Rafsec Debuts Packaging RFID Tag" RFID Journal Inc., Sep. 18, 2003, Available online at http://web.archive.org/web/20030920054334/http://www.rfidjournal.com/article/articleview/577/1/1/.*

PCT Int'l Application No. PCT/US2007/016285 Int'l Filing Date Jul. 18, 2007 International Search Report and Written Opinion dated Feb. 19, 2009.

International Search Report and Written Opinion for International Application No. PCT/US2007/016282, Mailing Date: Feb. 19, 2009, 23 pages.

* cited by examiner

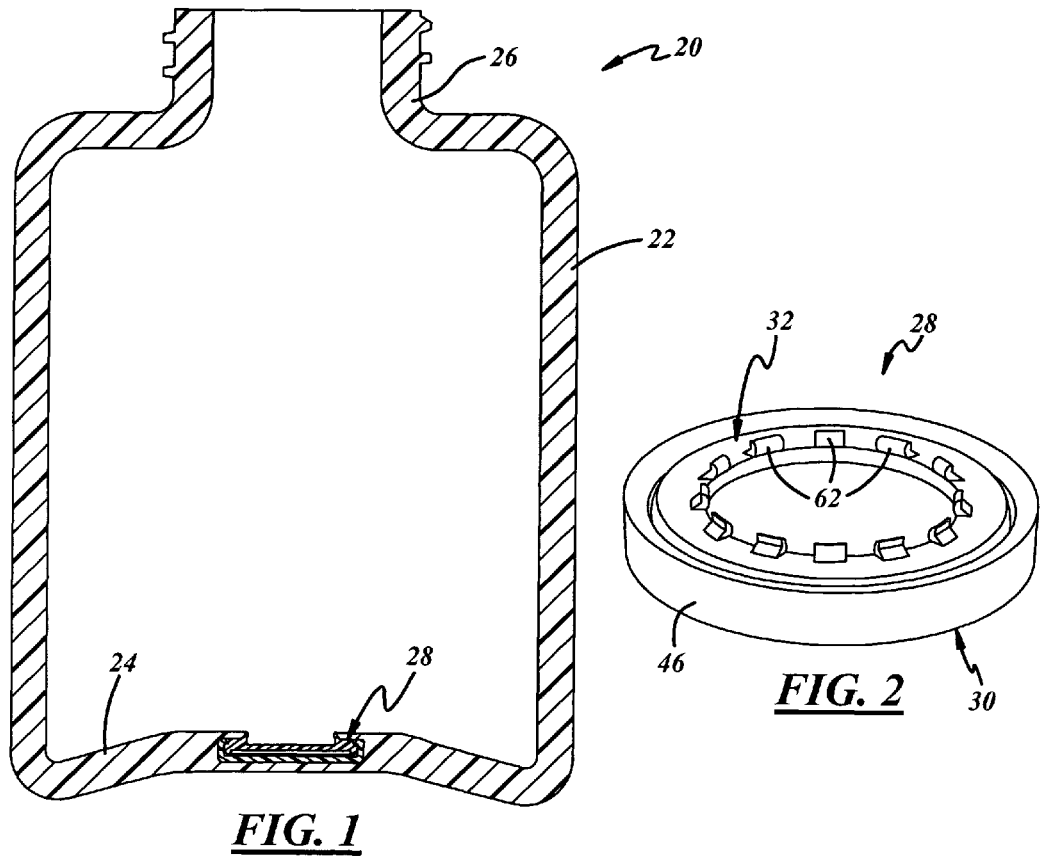
FIG. 1
FIG. 2
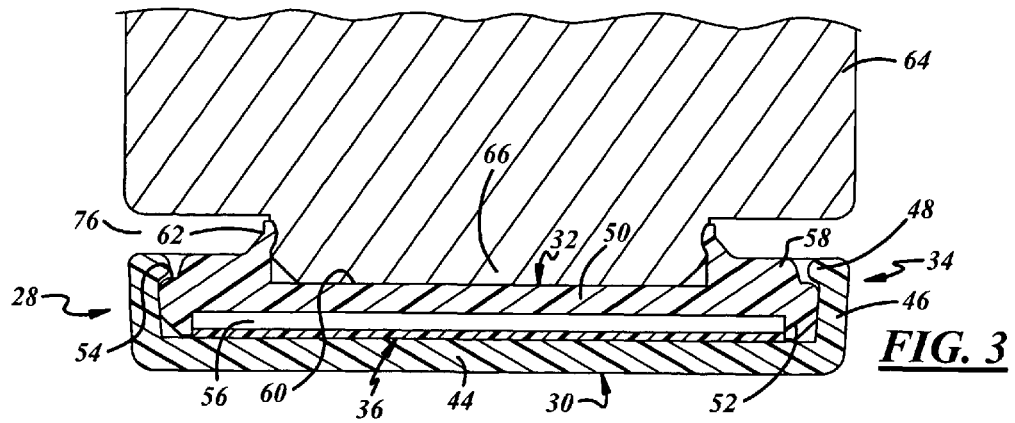
FIG. 3

US 7,875,227 B2

MOLDED PLASTIC CONTAINER AND PREFORM HAVING INSERT-MOLDED RFID TAG

The present disclosure relates to manufacture of a molded plastic container having a radio frequency identification (RFID) tag insert molded into a wall of the container, to manufacture of a preform for blow molding into a plastic container and having an RFID tag insert molded into a wall of the preform, and to an RFID assembly for insert molding into a wall of a container or a container preform.

BACKGROUND AND SUMMARY OF THE DISCLOSURE

It has been proposed to place an RFID tag on or in a wall of a container to confirm the genuineness of the package that includes the container and/or to provide other information concerning the package or a product within the package. Such RFID tag can be secured to a wall of the container after fabrication of the container, embedded in a wall of the container during blow molding of the container, or assembled to a container preform in such a way that the tag will be embedded in a wall of the container following blow molding of the preform.

U.S. application Ser. No. 11/348,662 filed Feb. 7, 2006 discloses a method of making a plastic container having an RFID tag in a wall of the container by providing a mold that includes a mold core and mounting on the mold core an insert that includes an RFID tag. A plastic preform is formed in the mold around the mold core and insert such that the insert is embedded in a wall of the preform. The preform can be blow molded into a plastic container having the insert embedded in a wall of the container. In two exemplary embodiments disclosed in the noted application, the insert is mounted on the mold core by the heat of the mold core that causes the insert to adhere to the mold core, or by means of an embossment on the insert being press fit into a pocket on the mold core. A general object of the present disclosure is to provide a method of making a container and/or a container preform in which the RFID insert is reliably mounted on the mold core, and/or to provide an RFID insert for mounting on the mold core.

The present disclosure embodies a number of aspects that can be implemented separately from or in combination with each other.

An RFID assembly, in accordance with one aspect of the present disclosure, includes a base having a peripheral wall, an RFID inlay including an RFID tag disposed within the peripheral wall, and a disk having a periphery engaged by the peripheral wall to capture the inlay between the base and the disk within the peripheral wall. One of the base and the disk has external fingers for releasably securing the assembly to a support structure, such as a projection on a mold core for disposition within a mold cavity to mold a container preform around the mold core within which the RFID assembly is embedded. The container preform can be blow molded into a hollow plastic container within which the RFID assembly is embedded. The projection preferably is on an end of the mold core, so that the RFID assembly is embedded in an end wall of the preform and a bottom wall of the container.

BRIEF DESCRIPTION OF THE DRAWINGS

The disclosure, together with additional objects, features, advantages and aspects thereof, will best be understood from the following description, the appended claims and the accompanying drawings, in which:

FIG. 1 is a sectional view of a blow molded plastic container in accordance with an exemplary embodiment of the present disclosure;

FIG. 2 is a perspective view of an RFID assembly in accordance with the exemplary embodiment of the present disclosure;

FIG. 3 is a sectional view of the RFID assembly in FIG. 2 mounted on the end of a mold core;

DETAILED DESCRIPTION OF PREFERRED EMBODIMENTS

FIG. 1 illustrates a blow molded plastic container 20 in accordance with an exemplary embodiment of the present disclosure. Container 20 includes a body with a sidewall 22 that connects a bottom wall 24 to a neck finish 26. Sidewall 22 can be of any suitable geometry, such as cylindrical. Bottom wall 24 is illustrated as having a center push-up, although this is not necessasry to the present disclosure. Sidewall 22, bottom wall 24 and neck finish 26 can be of any suitable geometry and can have any suitable embossments or other features. The container neck finish, sidewall and/or bottom wall can be of monolayer or multilayer construction. Neck finish 26 can be absent in some containers.

Figure 4:
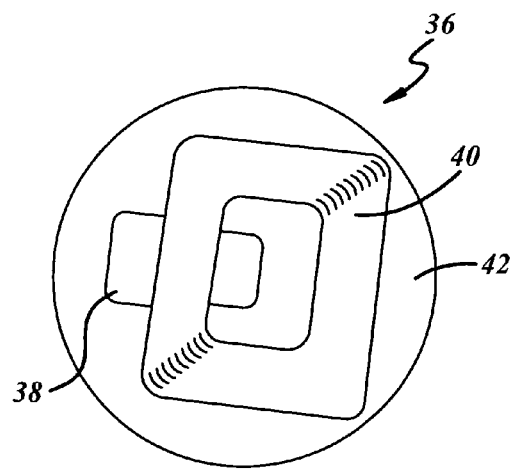
FIG. 4 is a plan view of the RFID inlay in the RFID assembly of FIGS. 2 and 3.

An RFID assembly 28 is insert molded into a wall of container 20, preferably bottom wall 24. RFID assembly 28 is illustrated in greater detail in FIGS. 2-4 as including a base 30 and a disk 32 that together form an insert housing 34, and an RFID inlay 36 enclosed within housing 34. An exemplary inlay 36 is illustrated in FIG. 4 as including an RFID tag or circuit 38 coupled to an rf antenna 40 and mounted on a substrate 42. The illustrated geometries of tag 38, antenna 40 and substrate 42 illustrated in FIG. 4 are exemplary only.

Base 30 of housing 34 includes a base wall 44 that preferably is flat and circular, and from which a peripheral wall 46 extends. Peripheral wall 46 preferably has an internal bead 48 spaced from base wall 44. Internal bead 48 can be circumferentially continuous or segmented around the circular geometry of peripheral wall 46. Disk 32 includes a generally flat wall 50 that is spaced in assembly from base wall 46 sufficiently to receive inlay 36. A peripheral wall 52 preferably extends from wall 50 to base wall 44 of base 30 and has a recess 54 that preferably is captured by snap fit within internal bead 48. A recess within peripheral wall 52 cooperates with base wall 48 of base 30 to form a hollow cavity 56, preferably circular, within which inlay 36 is disposed.

A raised periphery 58 on disk 32 forms a central pocket 60. An annular array of flexible resilient prongs or fingers 62 extend from raised disk portion 58 around pocket 60. Prongs 62 preferably are concentric with the central axis of disk 32 and assembly 28, and are angularly spaced from each other as best seen in FIG. 2. Snap fit of disk 32 within base 30 preferably is such that inlay 36 is sealed within cavity 56 at least for a time sufficient to mold assembly 28 into a preform or container wall. The positions of disk 32 and base 30 could be reversed, which is to say that pocket 60 and fingers 62 could be formed on base 30 rather than disk 32.

Figure 5:
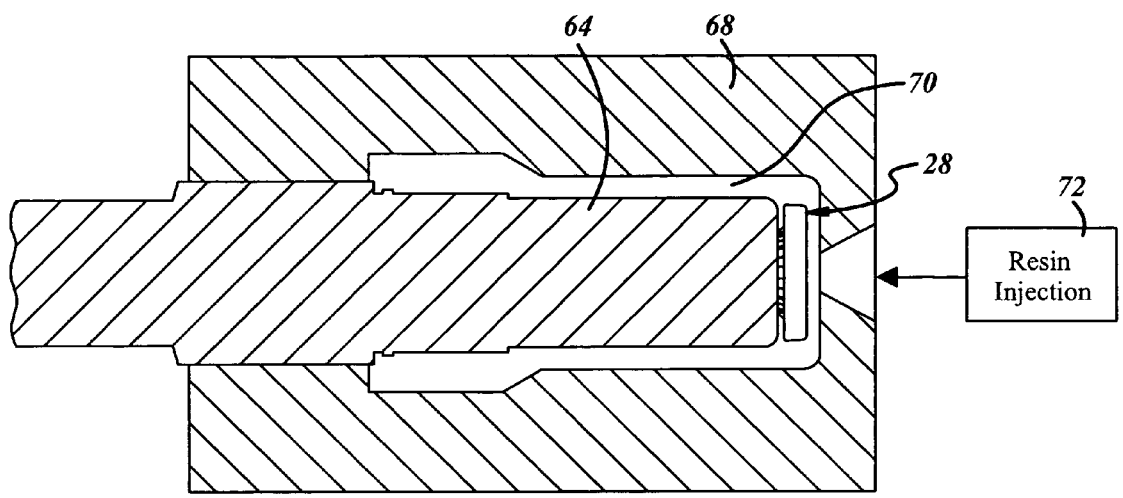
FIG. 5 is a sectional schematic illustration of an apparatus for molding a container preform in accordance with an aspect of the present disclosure.
Figure 6:
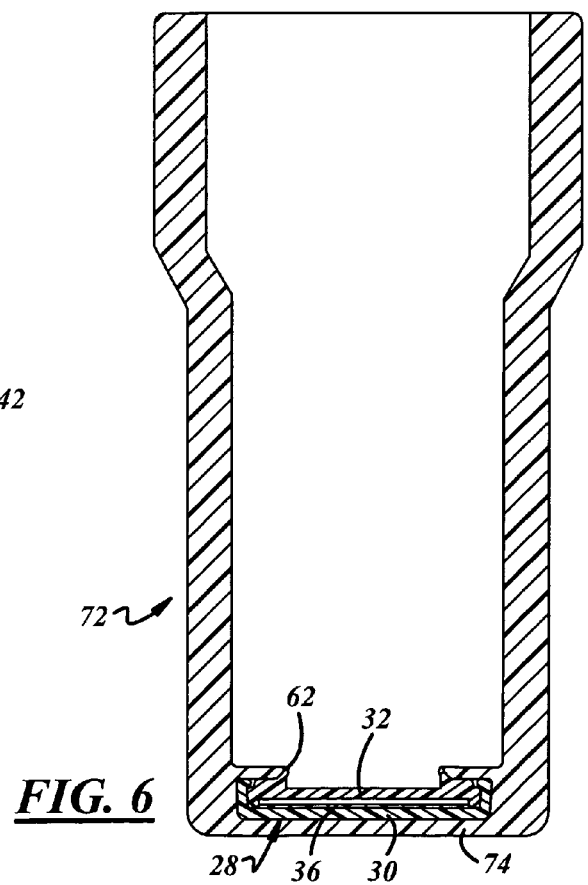
FIG. 6 is a sectional view of an exemplary container preform made in the apparatus of FIG. 5 for blow molding the plastic container of FIG. 1.

To form a plastic container, RFID assembly 28 is secured to the end of a mold core 64 (FIGS. 3 and 5), preferably by resiliently snapping flexible fingers 62 over a projection 66 on core 64. Projection 66 can be of any suitable geometry, preferably circular, and can be solid or hollow. Projection 66 most preferably is disposed on the end of core 64. With RFID assembly 28 thus firmly secured to core 64, core 64 is inserted into a mold 68 (FIG. 5) so as to form a mold cavity 70 around core 64 and assembly 28. Resin is then injected from a suitable source 72 into cavity 70 around core 64 and RFID assembly 28 so as to form a preform 72 (FIG. 6) in which assembly 28 is embedded by insert molding, preferably within the end wall 74 of the preform. Preform 72 can be removed from core 64 for later processing in a reheat blow molding operation, or can be moved on core 64 to a blow mold station for blow molding container 20 (FIG. 1) in an injection blow molding operation. Fingers 62 hold RFID assembly in place on core 64 prior to molding of the preform, but are sufficiently flexible readily to release from core projection 66 when removing preform 72 from the mold core or blowing the preform for the mold core. Pocket 60 of base 32 that is occupied by projection 66 on core 64 remains free of plastic material during molding of the preform and during blow molding of the container. However, the gap 76 (FIG. 3) between disk 32 and the end of core 64 surrounding projection 66 is filled with plastic material during the preform injection operation (FIG. 6) and remains filled with plastic material during the blow molding operation (FIG. 1) so that RFID assembly 28 is firmly embedded within wall 24 of container 20, which preferably is the bottom wall of the container. The plastic material that enters gap 75 also seals the joint between disk 32 and base 30.

There thus have been disclosed an RFID assembly, a method of molding an RFID tag into a container, and a preform and a container made by such method, which fully satisfy all of the objects and aims previously set forth. The disclosure has been presented in conjunction with an exemplary embodiment, and additional modifications and variations have been discussed. Other modifications and variations readily will suggest themselves to persons of ordinary skill in the art in view of the foregoing description. The disclosure is intended to embrace all such modifications and variations as fall within the spirit and broad scope of the appended claims.

The invention claimed is:

1. A method of molding an RFID tag into a container, which includes the steps of:
   (a) providing a mold that includes a mold core and a mold cavity,
   (b) providing an RFID assembly that includes:
   a base having a peripheral wall,
   an RFID inlay, including an RFID tag, disposed within said peripheral wall, and a disk having a periphery internally engaging said peripheral wall to capture said inlay between said base and said disk within said peripheral wall,
   one of said base and said disk having an annular array of external flexible resilient fingers for releasably securing said assembly to a support structure,
   (c) mounting said RFID assembly to said mold core by releasably fastening said fingers around a projection on said mold core,
   (d) inserting said mold core into said mold cavity, and
   (e) molding a container preform in said mold cavity around said mold core and said RFID assembly.

2. The method set forth in claim 1 wherein said step (e) is carried out by injection molding.

3. The method set forth in claim 2 wherein said projection is on an end of said mold core and said step (c) is carried out by releasably snapping said fingers around said projection.

4. The method set forth in claim 3 including: (f) blow molding said preform into a hollow plastic container.

\* \* \* \* \*